June 19, 1956    T. C. McGOW    2,751,057
CONVEYOR FLIP-SWITCH
Filed March 9, 1953    4 Sheets-Sheet 1

INVENTOR
THOMAS C. McGOW
BY
ATTORNEY

June 19, 1956 T. C. McGOW 2,751,057
CONVEYOR FLIP-SWITCH
Filed March 9, 1953 4 Sheets-Sheet 2

INVENTOR
THOMAS C. McGOW
BY Peter P. Price
ATTORNEY

June 19, 1956     T. C. McGOW     2,751,057
CONVEYOR FLIP-SWITCH

Filed March 9, 1953     4 Sheets-Sheet 3

INVENTOR
THOMAS C McGOW
BY
ATTORNEY

INVENTOR
THOMAS C McGOW
BY
ATTORNEY

United States Patent Office 2,751,057
Patented June 19, 1956

2,751,057

CONVEYOR FLIP-SWITCH

Thomas C. McGow, Convent Station, N. J., assignor to The Rapids-Standard Company, Inc., Grand Rapids, Mich., a corporation of Michigan Application March 9, 1953, Serial No. 341,013

14 Claims. (Cl. 193—36)

This invention relates to gravity conveyors and more particularly to a flip switch designed to alternately connect a main conveyor track with one of two diverging side tracks.

My invention is concerned with the problem of designing equipment for gravity conveyor systems wherein it is desired to alternately direct articles from a main track onto a side track and to direct articles from a different side track onto the main track. No switch of simple construction and positive operation has heretofore been developed that is satisfactory for this purpose. In order to cause the articles to move from the main track onto the receiving track, it is necessary that the track of the switch slope downwardly toward the receiving track. Satisfactory movement of the articles through the switch requires a pitch of at least 5 to 6 inches in 10 feet. This sharp pitch is made necessary, partially by the additional friction created by the curved path of the switch.

When the switch is used to receive articles from a discharging line, the same pitch must be provided but in the opposite direction. Herefore this problem has never been solved by the use of a single switch. It has always been necessary to utilize two main lines of conveyor, each limited to moving the articles in one direction only. This, by itself, is a heavy additional expense. When, however, the main line or track adjacent the switch is a powered conveyor for elevating the articles such as is used between floors, the added expense becomes even more substantial.

My switch is designed for use abutting to and in conjunction with a powered belt conveyor, which may be of either the ramp or horizontal type. The powered belt conveyor may be either discharging onto or receiving material from the switch. The belt conveyor may be inclined either downwardly or upwardly from the switch. The end of the switch, where its tracks converge, is the end abutting the inclined belt conveyor. A ramp conveyor, either power or gravity, may be pivoted adjacent the end of the switch for vertical movement to successively align with one of several vertically arranged tracks.

It is the primary object of my invention to provide a switch of simple construction which, when directed toward one track, will have a downward slope to cause articles to move off the main track onto the side track and, when turned toward the other track, will be inclined in the opposite direction to cause articles to move off a side track onto the main track. It is a further object of my invention to provide such a switch, utilizing standard gravity, conveyor sections. It is a further object of my invention to provide a conveyor switch which will be durable and dependable in operation.

These and other objects and purposes of my invention will be immediately seen by those acquainted with the design and construction of materials handling equipment upon reading the following specification and the accompanying drawings.

In executing the objects and purposes of my invention, I have provided a conveyor switch consisting of two lengths of gravity conveyor track, at least one of which is curved along its longitudinal axis. These two tracks are rigidly mounted back to back and spaced apart vertically. The resulting track assembly is supported on a pair of pivot points. One of these pivot points is located substantially at the geometric center of one of the ends of the switch. The other pivot point is located to the side of the curved length of track and vertically offset toward one of the tracks. The whole is mounted upon a supporting structure having a pair of posts, one on each side of the track assembly, and each designed to support the track when flipped toward that post. The switch is so designed that when in one position, the upper track will be inclined downwardly toward the end at which the pivot is located near the geometric center of the track assembly and when turned over the upper track will be inclined downwardly away from this same point. The result is a switch, in one position causing articles to run downwardly off the main track, and in the other position, causing articles to run onto the main track.

Figure 2:
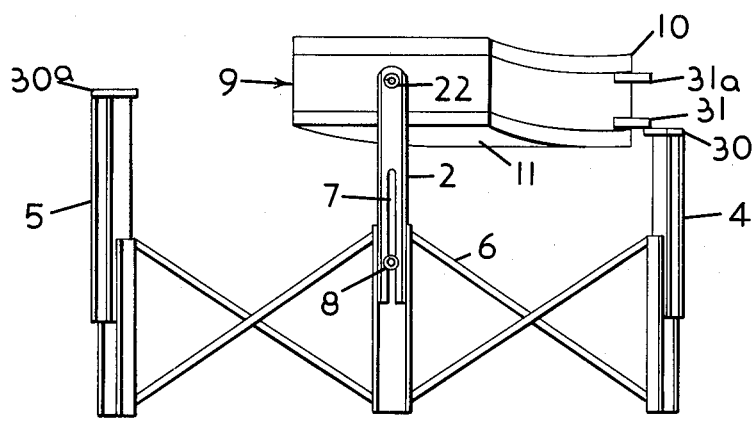
Figure 2 is an end elevation of my invention taken along the plane II—II of Figure 1, showing the conveyor track in outline only.

In the following description the terms "upwardly" and "downwardly" are used and are to be taken to mean "upwardly" as the invention appears in Figure 2 and "downwardly" away therefrom.

Referring specifically to the drawings, the numeral 1 indicates a standard having a pair of main legs 2 and 3 and a pair of side legs 4 and 5 connected by bracing 6. Each of the legs 2, 3, 4 and 5 is made vertically adjustable by a slot 7 and a locking bolt 8.

Figure 5:
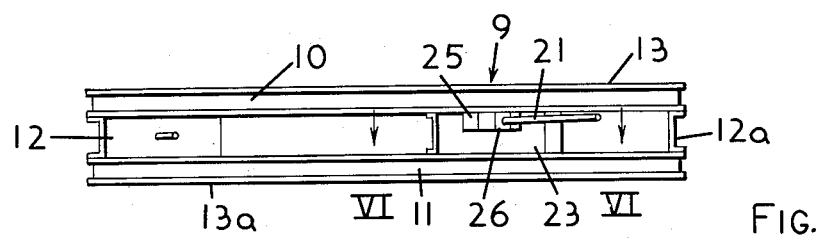
Figure 5 is a side elevation view taken along the plane V—V of Figure 3 showing the frame structure for the conveyor track only.

The bed 9 of the switch consists of a pair of curved conveyor track sections 10 and 11 joined at their ends by frame plates 12 and 12a (Fig. 5). The frame of the track section 10 consists of a pair of parallel side channels 13 between which extend axles 14 mounting the freely rotatable, conveyor wheels 15. The axles 14 are aligned along the radii of a circle concentric with the arcs traced by the side rails 13. Thus, the conveyor wheels 15 are arranged to guide articles moving over them through an arcaute path concentric with the arcs of the side rails.

The track section 11 has a pair of curved side rails 13a identical to the side rails 13 and mounting axles and conveyor wheels identical to the axles 14 and conveyor wheels 15 respectively. The conveyor wheels of both track sections project a short distance outwardly beyond the side rails 13 and 13a to prevent articles travelling thereover from contacting the side rails. Since the track sections 10 and 11 are vertically superimposed, the track section 10 is a right-hand curve and the track section 11 is a left-hand curve.

Figure 1:
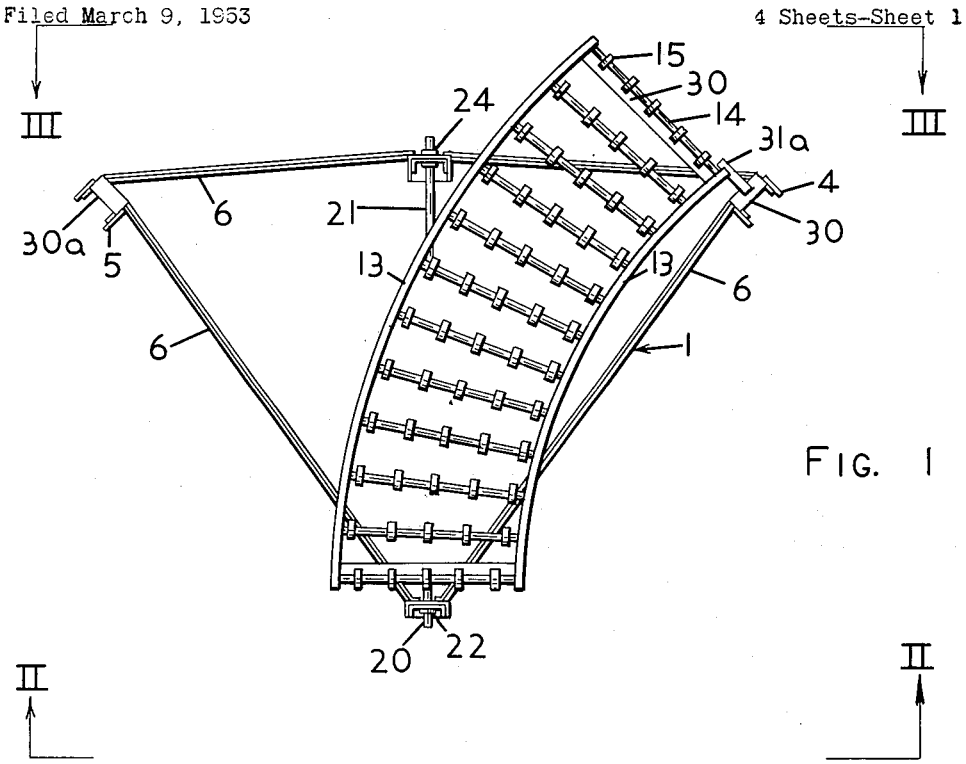
Figure 1 is a plan view of my invention.
Figure 6:
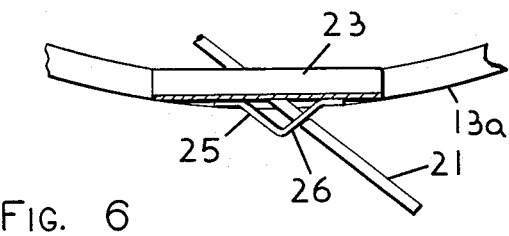
Figure 6 is an enlarged, fragmentary sectional view taken along the plane VI—VI of Figure 5.

The switch bed 9 is secured to the standard 1 by means of a pair of pivots 20 and 21. The pivot 20 consists of a short length of shaft rigidly affixed to the frame plate 12 substantially at the geometric center of one end of the track assembly. The pivot 20 is rotatably journaled in the upper end of the standard 2 by means of the bearing 22. The pivot 21 consists of another length of shaft longer than the pivot 20. The pivot 21 is rigidly secured adjacent one end to a plate 23 attached to one side rail of each track section (Figs. 5 and 6). Because of the sharp angle at which the pivot 21 passes through the plate 23 a reinforcing bracket 25 is secured to the plate 23 designed with a face 26 normal to the pivot. The pivot 21 is rotatably seated in the bearing 24 in the upper end of the leg 2. In the form of my invention shown in Figure 1, the axis of the pivots 20 and 21 are aligned and are tangent to the central axis of the switch bed 9 at the pivot 20. The axis of the pivots 20 and 21 is substantially horizontal with the switch bed inclined thereto. Thus, the pivot 21 is offset toward one of the track sections 10 and 11. This offset is substantially one-half the spacing between the track sections 10 and 11 and for efficient operation should be several inches. This arrangement produces a downward inclination toward the pivot 20, when the switch bed is rotated in one direction and an upward inclination toward the pivot 20, when the switch bed is rotated in the other direction.

Each of the side legs 4 and 5 has, at its upper end, a flat stop plate. The stop plate 30 is mounted on the leg 4 and the stop plate 30a is mounted on the leg 5. The stop plates 30 and 30a cooperate with the arms 31 and 31a, respectively, mounted on the switch bed 9.

Figure 4:
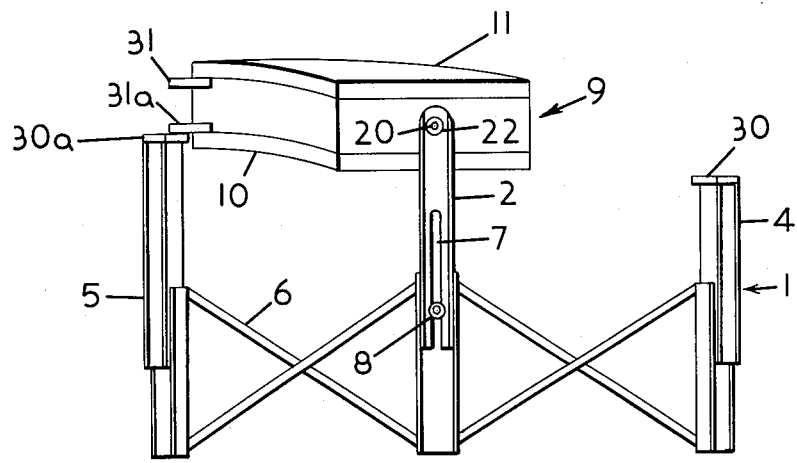
Figure 4 is an end elevation of my invention taken along the same plane as Figure 2 with the switch flipped in the opposite direction, showing the conveyor track in outline only.
Figure 3:
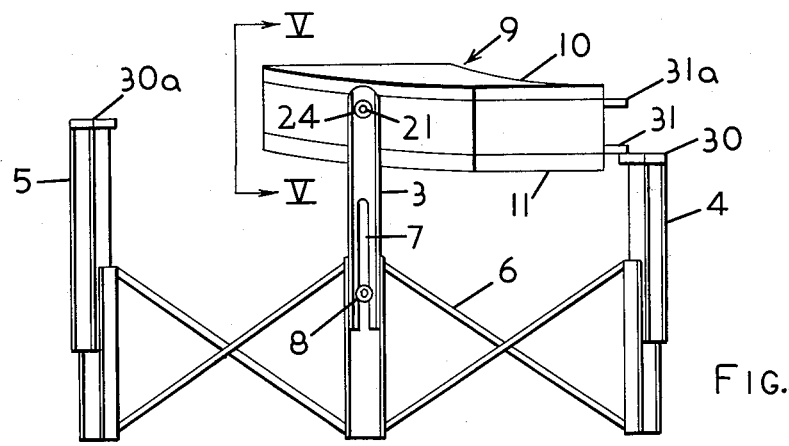
Figure 3 is an end elevation of my invention taken along the plane III—III of Figure 1, showing the conveyor track in outline only.

The arm 31 is mounted to the frame plate 12a and abuts the inoperative face of the track section 11. The arm 31a is mounted to the frame plate 12a and abuts the inoperative face of the track section 10. The arms 31 and 31a are thus separated a distance equal to the spacing between the tracks of the switch bed 9. When the switch bed 9 is flipped to the right, as it appears in Figures 1, 2 and 3, the arm 31 rests on the stop plate 30 limiting rotation of the track section about the pivots 20 and 21. When the switch bed 9 is pivoted to the left, as it appears in Figure 4, the arm 31a rests upon the stop plate 30a. Since the side of the switch bed opposite from the arms is supported by the pivot 21, the bed has a tendency to rotate toward these arms. The pivot 21 together with either one of the arms 31 or 31a provides complete support for the outward end of the switch bed 9.

It will be recognized that while the pivots 20 and 21 are described as stub shafts, they could be fabricated as a single, long rod extending through the switch bed 9. At the same time either the rod or the stub shafts could be rigidly affixed to the legs 2 and 3 and extend through suitable bearings on the frame plates 12 and 12a.

The conveyor sections 10 and 11 are designed to be laterally horizontal at both ends. This properly aligns them with the ends of the remainder of the conveyor system into which they are incorporated. This cannot be accomplished with curved sections maintaining throughout their length their lateral axis in a horizontal plane when their longitudinal axis is inclined. To avoid the difficulties produced by this, it is conventional practice to place curved switch sections in a horizontal plane. This requires the articles to move over the switch by momentum alone. In many cases the article must be moving at an excessive speed to prevent stalling.

To eliminate this difficulty, the side rails of the tracks 10 and 11 are twisted between their ends. The twist may be applied to both the inner and outer rails or it may be applied to only one of them. This twisting permits both ends of these tracks to be in a laterally horizontal plane.

Although it is not essential to the operation of the switch itself, the pivot 20 is preferably located about three-eighths of an inch closer to the track 10. This results in a height differential of three-quarters of an inch between the operating positions of the tracks 10 and 11. The purpose of this differential will be explained under "Operation."

Modifications

My invention has been described when embodied in a flip switch having a pair of curved track sections mounted in back to back relationship. The invention can also be embodied in a switch having one straight and one curved track section (Figs. 8, 9, 10 and 11). The straight track section 41 of the switch bed 40 has a pair of parallel side rails 42. The curved track section 43 has a pair of side rails 44. The straight track section 41 is tangent to and vertically aligned with one end of the curved track section 43. At this end the track sections 41 and 43 are rigidly joined by a frame plate 45. The track section 41 and the other end of the curved track section are rigidly joined by beams 46 and 47. The frame plate 45 and beams 46 and 47 are of identical height, making the track sections of the switch bed parallel.

Figure 12:
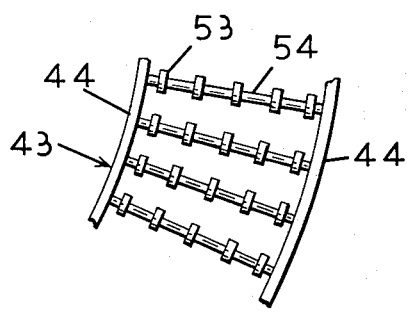
Figure 12 is a fragmentary plan view of a typical wheel arrangement for the conveyor track of the modified switch appearing in Figure 8.
Figure 15:
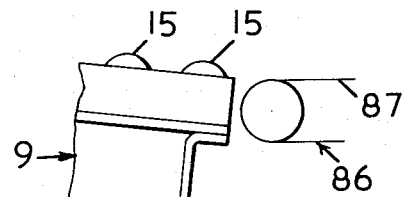
Figure 15 is an enlarged fragmentary view of one end of my flip switch.
Figure 16:
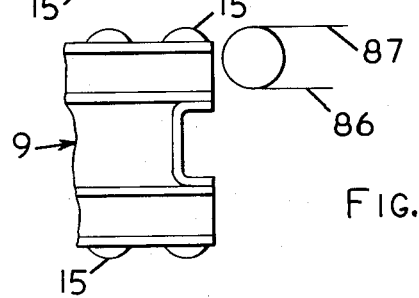
Figure 16 is an enlarged fragmentary view of the same end of my flip switch as shown in Figure 15 with the switch bed inverted.

The switch bed 40 is designed to be mounted on a standard similar to the standard 1 by means of the pivot shafts 48 and 49. The radially inner end of the curved track 43 has a pair of projecting stops 50 and 50a having the same purpose and function as the stops 31 and 31a. The outer end of the curved track 43 is laterally braced by a cross frame member 52. The track sections 41 and 43 are both equipped with conveyor wheels 53 mounted on axles 54 identical to the wheels 15 and axles 14, respectively and as typically shown in Figure 12.

The pivots 48 and 49 are axially aligned in a horizontal plane. The pivot 48 is attached to the frame plate 45 substantially at the geometric center of the end of the switch bed 40. The pivot 49 is midway between the rails 42 of the straight track section 41 but is vertically offset toward the curved track section 43. This arrangement provides a switch in which the curved track 43 will conduct articles away from the pivot 48 and the straight track will conduct articles toward the pivot 48. The switch may be constructed with the pivot 49 offset toward the straight track 41. This will reverse the flow of articles over the respective tracks.

The pivot 48 is preferably vertically offset toward the straight track section 41 about three-eights of an inch. The purpose of this will be explained under "Operation." The axis of the pivots 48 and 49, at the pivot 48, is tangent to the curved track 43. This axis is also parallel to the straight track 41.

When the switch beds 9 and 40 are constructed with the vertically offset pivots 21 and 49 respectively permanently located on the bed structure, each switch is limited to either a right or a left-hand operation. That is, depending upon the direction of offset of the pivots 21 and 49, the switch will deliver articles to the right and receive from the left but not vice versa.

Figure 14:
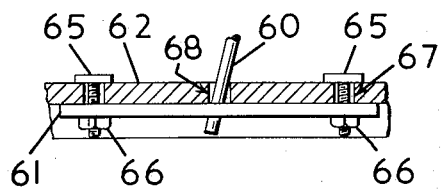
Figure 14 is a sectional view taken along the plane XIV—XIV of Figure 13.
Figure 9:
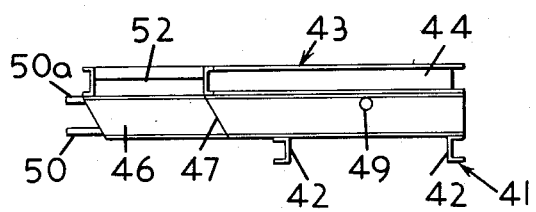
Figure 9 is an end elevation of the modified form of my invention taken along the plane IX—IX of Figure 8.
Figure 13:
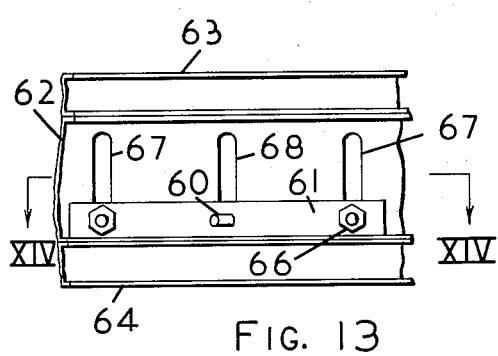
Figure 13 is an enlarged fragmentary view of a modified attachment for the pivot rod for my improved flip switch.

By making the pivots 9 and 49 vertically adjustable, the switches may be adapted to both receive and deliver to either side, depending upon the requirements of the installation into which they are incorporated. This may be accomplished by securing the vertically offset pivot 60 to a vertically movable bar 61 (Figs. 13 and 14). The bar 61 is secured to the framed plate 62 extending vertically between the tracks 63 and 64 by means of bolts 65 equipped with nuts 66. The frame plate 62 is vertically slotted at 67 for each of the bolts 65 and at 68 for the pivot shaft 60. Reversal of flow over the tracks 63 and 64 is accomplished simply by loosening the nuts 66 and moving the bar to the opposite ends of the slots 67 and 68 before tightening again. To prevent slippage due to vibration, the surface of the frame plate 62 about the slots 67 and the abutting surface of the bar 61 may be serrated to firmly lock the parts together.

It will be understood that in the above description the pivot 60 represents either the pivots 21 or 49. When the pivots 21 and 49 are made vertically adjustable and the pivots 20 and 48 are vertically offset three-eighths of an inch, the pivots 20 and 48 must also be made vertically adjustable. However, this adjustment is limited to three-quarters of an inch. A structure identical to that shown in Figures 13 and 14 may be used for this purpose, the only difference being that the slots 67 and 68 will be shortened to correspond with the limited, vertical movement required.

Figure 17:
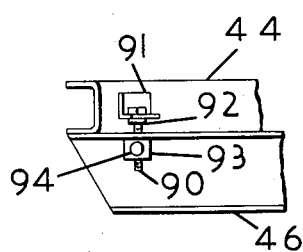
Figure 17 is an elevation view of means for adjusting the twist of the tracks of my switch.

In the case of the switch 40, I have developed means to twist one rail 44 of the curved track 43, making the twist adjustable. The radially inner rail 44 is not rigidly secured to the beam 46 but is joined to it by a bolt 90 (Fig. 17). The head of bolt 90 rests against the upper surface of the bracket 91 secured to the inside surface of the rail 44. The bolt 90 is held against upward movement through the bracket 91 by the collar 92, welded to the bolt. A block 93 is welded to the beam 46 and has a central, circular opening therethrough in which is mounted a rod 94 having a central, threaded aperture for receiving the bolt 90. The rod 94 may rotate slightly in the block 93 and clearance holes are provided through the block and beam for the bolt 90. This is necessary because the rail 44 will rotate slightly with respect to the beam 46 as the two are separated. By means of this arrangement, the radially inner rail may be raised with respect to the beam 46 until it is in a horizontal plane with the radially outer rail of this track. Each time the pitch of the switch 40 is changed, this twist must be adjusted.

Operation

My flip switch is designed to be incorporated into a gravity flow conveyor system at a point where the articles moving along a main conveyor line are to be alternately directed to and from two branch lines connecting with the main conveyor line. The main line may be either wholly or partially powered immediately adjacent the switch 9. Normally, it is designed to control the flow of articles to and from the opposite ends of a loop of gravity conveyor track either at the top or at the foot of a reversable, inclined, powered conveyor such as is used between floors of a warehouse either going up to a balcony or down to a basement.

Figure 7:
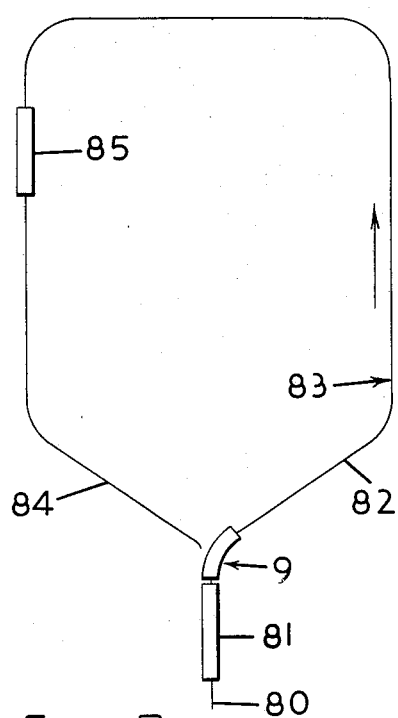
Figure 7 is a diagrammatic sketch of a conveyor system incorporating my invention.
Figure 8:
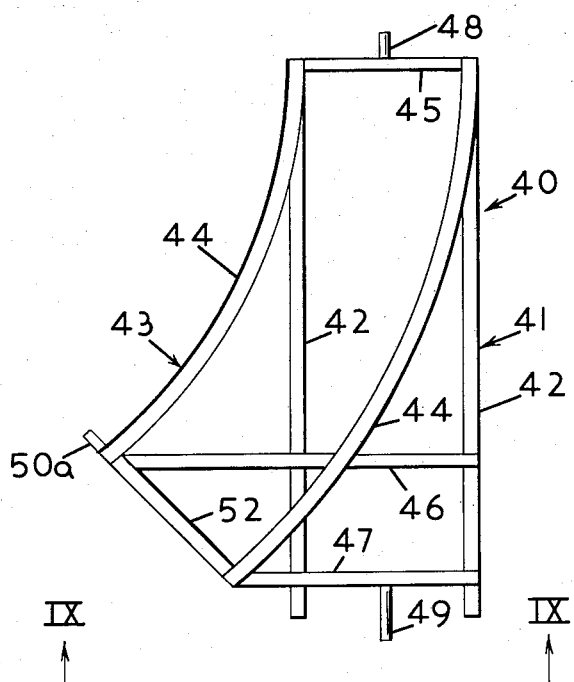
Figure 8 is a plan view of a modified form of my invention, showing the frame of the conveyor track only.

In a conveyor flow system as shown in Figure 7, the articles approach on one floor along the main gravity line 80, are then elevated by the powered conveyor 81 to the next floor where they are delivered to the conveyor switch 9. In Figure 7 the conveyor switch 9 is shown flipped to connect with the leg 82 of the loop of gravity conveyor 83. In this case the switch bed 9 is inclined downwardly away from the powered conveyor 81 whereby the articles delivered from the powered conveyor will be induced to travel onto the leg 82. The downward inclination of the loop 83 carries the goods along as indicated by the arrow. The loop 83 acts as a distribution system, and as the goods pass along the loop 83, they are removed and stacked at various locations. In this operation the conveyor is functioning to stock the warehouse.

When it is desired to remove the goods from the warehouse, the switch bed 9 is rotated 180° to connect with the leg 84 of the conveyor loop 83. In this case the switch bed 9 is inclined downwardly toward the powered conveyor 81. The direction of operation of the powered conveyor 81 is reversed to carry goods down to the main conveyor 80. Articles removed from various locations in the warehouse are then placed upon the gravity loop 83 where they travel around in the direction indicated by the arrow and, by the switch bed 9, are directed onto the powered conveyor 81. Where the loop 83 is of substantial length, it may become necessary to elevate the articles to provide sufficient drop in the loop to assure proper movement of the articles along the gravity track. This may be accomplished by incorporating a short section of upwardly inclined power conveyor 85 in the loop.

It is seen that to get the articles both on and off the power conveyor 81, it is necessary that the switch bed 9 alternately slope toward and away from the power conveyor. Heretofore this has not been accomplished in a single switch. It has been necessary to provide two powered conveyors 81. The necessity for using the additional power conveyor 81 has greatly increased the cost of these conveyor systems.

Where the modified switch bed 40 is utilized the operation of the conveyor system will be the same except that one leg of the loop 83 will extend out straight from the power conveyor 81. This is merely a difference in form without a difference in the principle of operation.

The inclined power conveyor 81 is usually equipped with a short power driven tail section 86 (Figs. 10, 11, 15 and 16). It is to assure the proper delivery of goods to and from this power tail section 86 that the pivots 20 or 48 are offset about three-eighths of an inch. By means of this offset the tops of the conveyor wheels 15 and the belt 87 of the power tail 86 have a height differential of three-eights of an inch. When the switch bed is set to induce articles to move away from the power conveyor 81, the wheels 15 are below the belt 87. When the switch bed is set to induce articles to move onto the power conveyor 81 the wheels 15 are above the belt 87. This slight drop in the direction of movement of the articles assures proper transfer of the articles between the switch and the conveyor belt. It prevents the articles from becoming balanced at the transfer point, blocking the conveyor. Unless some provision is made to positively assure transfer of the articles from one conveyor to the other, continuing difficulty with the system may be experienced.

The stops 30 and 30a and the arms 31 and 31a are so located that the switch bed is always level in a lateral direction. This may be accomplished even though the floor is slightly uneven by vertical adjustment of the legs 4 and 5. If the switch bed is not level crosswise, the articles may have a tendency to track to one side of the other. This is particularly true of articles having irregular bottoms. Vertical adjustment of the legs 2 and 3 permits compensation for floor irregularities in levelling the axis of the pivots. At the same time the adjustability of the legs permits adaptation of the switch to various conveyor track heights.

Figure 11:
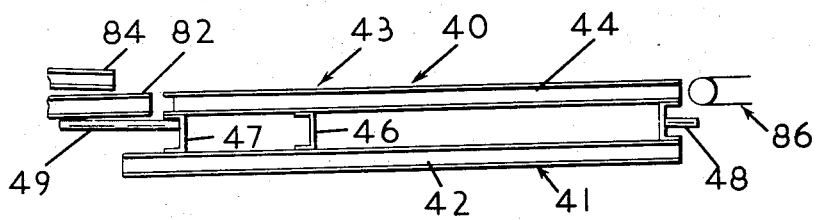
Figure 11 is a side elevational view of the modification appearing in Figure 8 with the conveyor track inverted.
Figure 10:
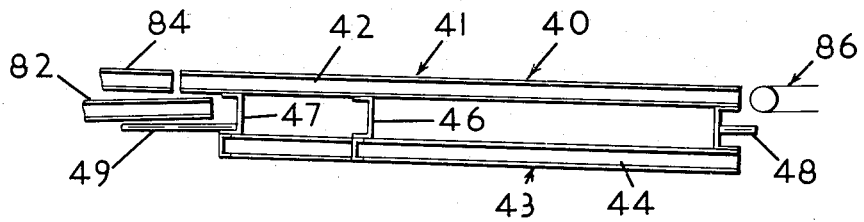
Figure 10 is a side elevation view of the modification appearing in Figure 8.

Since the pivot at the end of the switch adjacent the power conveyor 81 is always midway between the sides of the switch bed, the switch bed is aligned with the end of the power conveyor in either operating position. On the other hand, at the opposite end of the switch bed the end of only one of the track sections is aligned with the end of the gravity loop 83 at any one time. Since the switch bed is itself inclined, the ends 82 and 84 of the gravity conveyor loop 83 are at different elevations (Figs. 10 and 11). The currently inoperative end of the gravity loop 83 may be blocked with a suitable barrier to prevent articles being accidentally discharged at this end. This is a feature, however, which may be incorporated into the conveyor system independently of the switch and has no relationship to the functioning of the switch itself. Although my improved conveyor flip switch is shown as designed for manual rotation from one position to another, it will be recognized that by the addition of a suitable mechanism it may be caused to flip automatically from one position to the other. The controls for this mechanism may be located at some suitable, remote position.

These and other modifications of my invention may be made each without departing from the principle thereof. Each of these modifications is to be considered as included in the hereinafter appended claims unless these claims by their language expressly provide otherwise.

I claim:

1. In a gravity conveyor switch, the combination comprising: a switch bed having a pair of conveyor tracks at least one of which is longitudinally curved and frame means for rigidly securing said tracks together in vertically spaced back to back relationship; the ends of said tracks being vertically aligned at one end of said switch bed; a pair of pivots rotatably supporting said switch bed; the first of said pivots being mounted to said switch bed at the geometric center of said one end of said switch bed; the second of said pivots being axially aligned with said first pivot; the axis of said pivots being tangential to the central axis of said curved track at said one end of said switch bed, inclined to the plane of said switch bed and between the ends of said switch bed between the upper and lower surfaces thereof.

2. In a gravity conveyor switch, the combination comprising: a switch bed having a pair of conveyor tracks at least one of which is longitudinally curved and frame means for rigidly securing said tracks together in vertically spaced back to back relationship; the ends of said tracks being vertically aligned at one end of said switch bed; a pair of pivots rotatably supporting said switch bed; the first of said pivots being mounted to said switch bed at said one end of said switch bed midway between the sides of said switch bed and substantially equidistant from the top and bottom surfaces of said switch bed; the second of said pivots being axially aligned with said first pivot; the axis of said pivots being tangential to the central axis of said curved track at said one end of said switch bed, inclined to the plane of said switch bed and between the ends of said switch bed between the upper and lower surfaces thereof.

3. In a gravity conveyor switch as described in claim 2 wherein the axis of said pivots is horizontal.

4. In a gravity conveyor switch as described in claim 2 wherein stop means are provided for limiting rotation of said switch bed about said pivots to approximately 180°.

5. In a gravity conveyor switch as described in claim 2 wherein the axis of said pivots is horizontal; a standard for supporting said pivots; a pair of stop means on said standard for limiting rotation of said switch bed about said pivots to approximately 180°.

6. In a gravity conveyor switch, the combination comprising: a switch bed having a pair of conveyor tracks at least one of which is longitudinally curved and frame means for rigidly securing said tracks together in vertically spaced back to back relationship; each of said tracks having a pair of side rails; the ends of said tracks being vertically aligned at one end of said switch bed; a pair of pivots rotatably supporting said switch bed; the first of said pivots being mounted to said switch bed at said one end of said switch bed midway between the sides of said switch bed and substantially equidistant from the top and bottom surfaces of said switch bed; the second of said pivots being axially aligned with said first pivot; the axis of said pivots being tangential to the central axis of said curved track at said one end of said switch bed, inclined to the plane of said switch bed and, between the ends of said switch bed, between the upper and lower surfaces thereof; the rails of said curved track being twisted whereby both ends of said track lie in a laterally horizontal plane.

7. In a gravity conveyor switch, the combination comprising: a curved switch bed having a pair of vertically spaced operating faces; a pair of pivots for supporting said switch bed, said pivots aligned on an axis inclined to the plane of said switch bed; the pivot at one end of said track being midway between the sides of said switch bed and substantially equidistant from the upper and lower faces thereof; said other of said pivots being adjacent the other end of said switch bed; said axis of said pivots being tangent to said switch bed at said one end thereof and at all points within the area of said track being between said operating faces.

8. In a gravity conveyor switch as described in claim 7 wherein there is provided a base; said pivots being secured to said base; said base having a pair of stops, one on each side of said switch bed; bumpers on said switch bed adapted to contact said stops for limiting rotation of said switch bed about said pivots.

9. In a gravity conveyor switch, the combination comprising: a switch bed having a pair of curved track sections; frame means holding said track sections in vertically spaced and superimposed relationship; a pair of pivots on said frame means aligned on an axis inclined to the plane of said switch bed; the pivot at one end of said switch bed being midway between the sides of said switch bed and substantially equidistant from the upper and lower faces thereof; said axis of said pivots being parallel to a line tangent to said switch bed at said one end thereof and at all points within the area of said switch bed being between said track sections.

10. In a gravity conveyor switch, the combination comprising: a pair of curved conveyor sections said sections each being curved in an opposite direction and having one operating face; frame means securing said sections together in vertically spaced and aligned relationship with their operating faces in opposite directions; a base; a pair of horizontally aligned pivots on said base; the first one of said pivots secured to said frame means at one end of said sections, said first pivot being substantially equi-distant from the operating faces of said sections and equidistant from the sides of said sections; the second one of said pivots secured to said frame means adjacent the other end of said sections; said second pivot being aligned with said first pivot along an axis parallel to a line tangent to the side of said sections at said first pivot; said second pivot being vertically offset toward one of said sections whereby said sections are inclined to the axis of said pivots.

11. In a gravity conveyor switch, the combination comprising: a pair of curved conveyor sections; a plurality of conveyor wheels mounted on each of said sections with a segment thereof extending beyond said sections to provide an operating face; frame means securing said sections together in vertically spaced and superimposed relationship with their operating faces in opposite directions; a base frame; a pair of pivots for mounting said sections to said base, said pivots aligned along a horizontal axis; the first one of said pivots secured to said frame means at one end of said sections at a point substantially equidistant from the operating faces of said sections and equidistant from the sides of said sections; the second one of said pivots secured to said frame means adjacent the other end of said sections; the axis of said pivots being parallel to a line tangent to the sides of said sections at said first pivot; said second pivot being vertically offset toward one of said sections whereby said sections are inclined to said pivots; a pair of stops, one on each side of said sections adapted to contact said sections and limit rotation thereof about said pivots to an arc of substantially 180°.

12. In a gravity conveyor switch, the combination comprising: a switch bed having a pair of conveyor tracks, one of said tracks being straight and the other curved, and frame means for rigidly securing said tracks together in vertically spaced, back to back relationship; said curved track, at one end of said switch bed, being tangent to and vertically aligned with said straight track; a pair of pivots mounted to said frame means for rotatably supporting said switch bed; the first of said pivots being at said one end of said switch bed and located substantially equidistant from each of said tracks and midway between the sides thereof; the second of said pivots being at the other of the ends of said switch bed and located adjacent one of said tracks and midway between the sides of said straight track.

13. In a gravity conveyor switch, the combination comprising: a switch bed having a pair of conveyor tracks, one of said tracks being straight and the other curved, and frame means for rigidly securing said tracks together in vertically spaced, back to back relationship; said curved track, at one end of said switch bed, being tangent to and vertically aligned with said straight track; a pair of pivots aligned on a horizontal axis for rotatably supporting said switch bed; the first of said pivots being at said one end of said switch bed and located substantially equidistant from each of said tracks and midway between the sides thereof; the second of pivots being located at the other end of said straight track midway between the sides thereof; said conveyor bed being inclined to the axis of said pivots; said second pivot being offset toward one of said tracks approximately one-half the distance between said tracks.

14. A gravity conveyor switch as described in claim 13 wherein said curved track has a pair of side rails; means attached to one of said rails at the other of the ends of said curved track for adjusting said one rail vertically with respect to the other of said rails.

References Cited in the file of this patent

UNITED STATES PATENTS

| | | |
|---|---|---|
| 1,065,349 | Fletcher | June 24, 1913 |
| 2,457,408 | Sebastian | Dec. 28, 1948 |